UNITED STATES PATENT OFFICE.

LEVI S. FALES, OF CINCINNATI, OHIO, ASSIGNOR TO GALL, FALES & CO., OF SAME PLACE.

IMPROVEMENT IN PROCESSES OF PREPARING TRIPE, PIGS' FEET, &c.

Specification forming part of Letters Patent No. 155,510, dated September 29, 1874; application filed May 28, 1874.

*To all whom it may concern:*

Be it known that I, LEVI S. FALES, of Cincinnati, Hamilton county, Ohio, have invented a new and Improved Manufacture of Tripe, Pigs' Feet, &c., of which the following is a specification:

My invention has for its object the production, by an improved process, of a superior quality of an appetizing and wholesome article of diet from materials whose use is now, from the imperfect character of their preparation, greatly restricted.

This article is prepared as follows: I take the paunch (rumen or first stomach) or the rennet (abomasum or fourth stomach) of neat cattle, and, having opened the same and removed the contents, I wash said parts thoroughly in two waters, and steep the same in liquor prepared in the following manner: I take, say, twenty pounds of pearl-ash, (carbonate of potash,) and dissolve the same in about eight gallons of water. I take of caustic lime, say, one barrel, and slake the same with about four barrels of water, and let it stand six to eight hours, until the supernatant liquor becomes perfectly clear. I then add four gallons of the lime-water thus prepared to the lye, as above.

I take the washed tripe, as above, and put it into a kettle, tank, or other vessel adapted to be heated by steam, and to every hundred pounds of the tripe I put three gallons of the mixed liquor, as above. I then, by means of steam-pipes or other suitable heater, bring the contents to a heat a little below that of boiling water, preferably 190° Fahrenheit, and maintain the same at that temperature for a space of thirty or forty minutes. The tripe is then removed and spread upon a table, and the inner or mucous membrane removed by scraping. The tripe is then immersed in clear water in another vessel, also heated by steam, and to every hundred pounds of tripe two pounds of saleratus (bicarbonate of potash) are added. To this is added sufficient clear water to cover the tripe, and the whole is then boiled for about an hour. The tripe is then removed to a second table, and the exterior skin or cuticle is pulled off. The tripe thus scraped and skinned is then washed or rinsed in two separate waters, and placed in a third vessel and boiled for about two hours, or until sufficiently cooked.

The above process completes the manufacture of my tripe for immediate use or sale.

For long keeping, preservation, or transportation to warm climates, my tripe is further treated as follows:

For each hundred pounds of tripe prepared as above, I take three gallons of pure cider vinegar or wine, say of specific gravity of 32° to 34° Baumé, diluted with three gallons of water. To this I add two pounds of sugar, preferably white sugar, and boil the same for about one hour, removing the scum as it rises. The pickle thus prepared is then allowed to cool. The tripe is then snugly packed in jars or cans, or other suitable vessels, and enough of the pickle is added to cover it. The vessels are then hermetically sealed by means of solder, wax, or other known means. The vessels may then be labeled in any suitable manner to designate their contents and packed away for transportation, or otherwise disposed of.

Other animal substances, such as pigs' feet, may be prepared in the same manner as above, except that in the case of pigs' feet only the hoofs and bristles require removal.

This preparation, while making available products much of which are now very imperfectly utilized, affords a most nourishing, palatable, and digestible article of food, the pepsin contained in the substance of the membrane being, when the latter is properly prepared, a well-known stomachic and promoter of digestion; and hence my preparation is peculiarly fitted for the use of persons of weakened or impaired digestion. It proves to be a valuable dietary specific for convalescents and young children whose systems require a delicate yet nourishing viand.

When prepared from the reed or rennet, my tripe is well fitted for coagulating milk for table use, and for this purpose may be preserved in wine, salt, or other suitable preservative.

I claim herein as new and of my invention—

The process of preparing tripe by immersing and washing it in a solution of carbonate of potash, caustic lime, and water, scraping and heating the same at a temperature of not more than 190° Fahrenheit, and afterward applying clear water and bicarbonate of soda and again heating, substantially as set forth.

In testimony of which invention I hereunto set my hand.

LEVI S. FALES.

Attest:
GEO. H. KNIGHT,
O. V. CAYLOR.